Feb. 28, 1967  M. E. MATTSON  3,305,969
TREE OR PLANT PROTECTOR COLLAR
Filed Jan. 19, 1965

Merle E. Mattson
INVENTOR.

BY *Clarence A. O'Brien*
*and Harvey B. Jacobson*
Attorneys

United States Patent Office 3,305,969
Patented Feb. 28, 1967

3,305,969
TREE OR PLANT PROTECTOR COLLAR
Merle E. Mattson, Box 275, Tioga, N. Dak. 58852
Filed Jan. 19, 1965, Ser. No. 426,641
3 Claims. (Cl. 47—25)

This invention relates, generally classified, to prefabricated one-piece protector type mulching pads and collars which are functionally designed and structurally adapted to encircle a growing tree, plant or shrub and has to do, more particularly, with an adaptation which is unique in that it features certain new and useful improvements not found in prior art pads.

An object of this invention is to provide a readily applicable and removable pad type guard which is simple, practical, economical, long-lasting and well adapted to serve the advantageous purpose for which it is intended.

The hereindisclosed concept comprehends a pad or collar which is possessed of permanency, which may be wholly or partly porous, is preferably flat bottomed and will smother vegetation (grass and weeds) therebeneath, resists wear and damage, moistens and conditions the soil and earth therebeneath in a manner to promote uninhibited growth of the plant's trunk and roots, and minimizes lawn mowing requirements.

This invention is unique in that the outer marginal or peripheral edge is of restrictively limited thickness, say about one inch (1"). It follows that its presence on the ground encircling the plant or tree, does not interfere with the chore of mowing or trimming grass adjacent thereto.

Then, too, novelty is predicated on a compressibly resilient pad type guard or collar whose over-all top is coated or otherwise covered with a smooth-finished plastic film or equivalent ply of material of a predetermined color and texture and which is impervious to water and moisture and is, in addition, non-glaring so as to minimize objectionable light ray reflection on hot sunny days.

The principal innovation resides in a protector type pad or collar as above described and whose top is dished and accordingly concave with the result that the concavity or saucer thus provided functions to trap and pool rain water or water from a garden hose and feeds it to the plant's root system via the central hole or opening.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
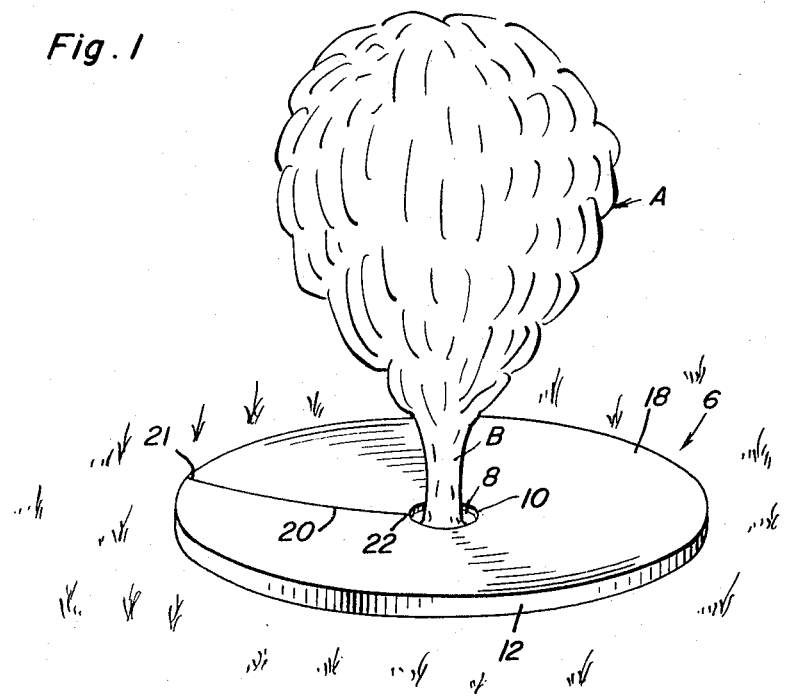
FIGURE 1 is a view in perspective which shows a padlike guard or collar constructed in accordance with the principles of the present invention and showing the manner in which it is constructed and used.

In FIGURE 1 the reference letter A designates the growing tree, plant or shrub whose truck B is protectively encircled by the readily aplicable and removable collar 6. As emphasized in FIGURE 2, this collar is provided with a circular or equivalent centralized opening 8, the marginal edge of which is denoted at 10. In this form the collar, which is circular in plan, the concentric outer marginal or peripheral edge is denoted at 12. The collar proper is made of appropriate material here shown as porous compressibly resilient plastic material 14. The bottom of the collar is generally flat as denoted at 16. The top is dished to provide the desired water trapping and pooling cavity. In actual practice the outer marginal edge portion of the pad or collar is approximately ¾" to 1" in thickness and the thickness dimension is gradually decreased from the outer peripheral edge 12 to the inner peripheral edge 10 encompassing the central trunk opening 8 where the thickness is approximately ⅛ of an inch. It follows that with this gradually diminished top side the desired concavity is provided. It will also be noted that this entire top side is covered or coated with a thin film of plastic material denoted generally at 18. The plastic material ranges between the two peripheral edges 10 and 12 as brought out in FIGURE 2. The collar or pad is also provided with a normally closed radial slit 20 which extends at one end through the marginal or peripheral edge 12 as denoted at 21 in FIGURE 1. The inner end of the slit, denoted at 22, opens into the opening or aperture 8. A practical adaptation of the collar, which has been put into use and which has served satisfactorily, was made with the diameter approximately 24" and the diameter of the hole 8 about 3". It will be feasible and desirable in practice to utilize a smooth finished plastic film or an appropriate paint for the top covering with a view toward providing a surface which is impervious to water and moisture. On the other hand the pad proper is not only compressibly resilient and flat bottomed but is amply porous to achieve the desired water distribution and moistening result.

Experience has shown that the use of a pad or collar (pervious or impervious material) functions to effectually smother vegetation (grass, weeds and growth) and to keep it from growing in a circle around the base of the plant or tree. The spreadable slit 20 will permit the user to spread the abutting edges sufficiently to straddle the trunk of the tree whereupon the collar can be slipped into the position shown in FIGURE 1. Whatever water is caused by rain or from a garden hose to fall atop the pad will be trapped and gravitate by way of the dished face toward the central opening and will be discharged through the opening. Such moisture as is absorbed by the pad proper will be spread throughout the fibers thereof and distributed to achieve the desired ground conditioning result. It follows that the dished collar or pad functions as a sort of a saucer and drains the water trapped through the hole 8.

It will be understood that while the collar is illustrated as annular or circular in plan, such configuration is not to be regarded as limiting inasmuch as it is within the purview of the concept to provide a pad which is non-circular and which under the circumstances could be square or of some similar non-circular geometrical configuration.

Figure 2:
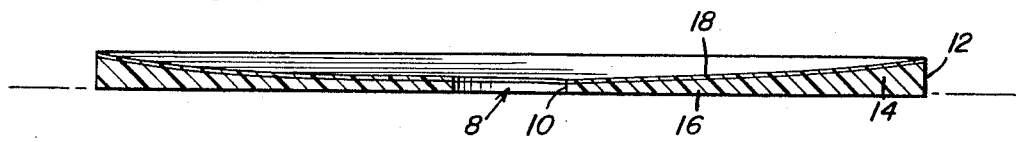
FIGURE 2 is a view of the collar on an enlarged scale and showing the same appearing in section.
Figure 3:
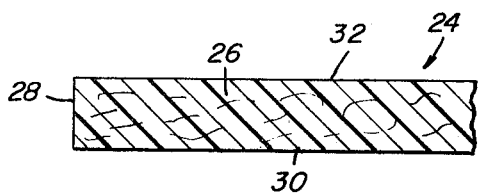
FIGURE 3 is a fragmentary sectional view of a modified form of the collar which instead of being dished is of uniform thickness throughout.

Whereas the protector collar shown in FIGURES 1 and 2 is possessed of the desired pervious and impervious properties, the fragmentary portion of the modified form shown in FIGURE 3 and denoted at 24 is preferably compressibly resilient and also porous. The body portion 26 is of an appropriate grade of porous commercial plastics. The outer marginal edge is denoted at 28, the flat bottom at 30 and flat spaced parallel top surface at 32. This pad is a one-piece construction rather than of the composite dished construction in FIGURES 1 and 2. Accordingly, it is of the same thickness (1" or so) throughout. It will be further understood that in this form of the invention (FIGURE 3) the pad or collar will be provided with the desired central opening (not shown) and openable and closable radial slit so that the finished pad can be readily applied and removed in the manner shown in FIGURE 1.

In use and assuming that the pad or collar is constructed and applied in the manner shown with particularity in FIGURE 1, it will be evident that the plant can be watered with a garden hose or otherwise, will absorb some of the water and by capillary action will distribute it and apply it to the surface of the soil around the trunk of the tree and will moisten the same. The use of color and reflection diminishing properties in either or both embodiments of the invention is an optional feature.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in promoting the growth of a tree or a plant, a pad-like guard comprising a collar provided at its center with an opening of a predetermined size and shape and designed and adapted to encircle the tree's trunk with its marginal edge spaced radially from the encompassed surfaces of said trunk, said collar being of a size in plan that a significant area of the earth surrounding the trunk can be covered in a manner to smother and prevent the growth of vegetation, such as weeds or grass within the bounds of the surface covered, said collar having a normally closed radial slit opening at an outer end through the outer perihperal edge and opening at its inner end through the peripheral edge of said centered opening, the underneath side of said collar being made of compressibly resilient porous material permitting the distribution of water capable of keeping the covered surface moist, the overall top side of said collar being coated with a thin plastic film of a predetermined color, said film being impervious to the passage of moisture, and, in addition, being possessed of minimal light reflecting properties capable of minimizing glare from sunlight and natural light particularly on hot sunny days, the entire top side of said collar being dished inwardly and downwardly and accordingly being concave whereby to trap and pool water which can then be fed to said trunk by way of said centered opening.

2. The structure defined in claim 1, and wherein said collar is circular in plan and about 24″ in diameter, ¾″ in thickness, said opening being about 3″ in diameter.

3. For use in promoting the growth of a tree or a plant, a pad-like guard comprising a collar provided at its center with an opening of a predetermined but prescribed size designed and adapted to encircle the tree's trunk but with its marginal edge spaced radially from the encompassed surfaces of said trunk, said collar being of a size in plan that a significant area of the earth surrounding the trunk can be and is covered in a manner to smother and prevent the growth of vegetation, such as weeds or grass within the bounds of the surface covered by said collar, said collar having a normally closed radial slit opening at an outer end through the outer peripheral edge of said collar and opening at its inner end through the peripheral edge of said opening, the underneath side of said collar being made of compressibly resilient porous material permitting the distribution of water capable of keeping the covered surface moist, the top side of said collar being dished and accordingly concave whereby to trap and pool water in the existing concavity, the overall top side being coated with a contoured thin ply of impervious plastic material of a predetermined color and having non-glare natural light reflecting properties the thickness of said collar being gradually and progressively diminished from about 1″ at the outer peripheral edge to about ¼″ at the peripheral edge of said opening, whereby to allow the blade means of a lawn mover to clear the top side of the collar without damage to the collar or the blade means.

References Cited by the Examiner

UNITED STATES PATENTS

| 1,910,289 | 5/1933 | Hoag | 47—9 |
| 1,931,602 | 10/1933 | Colman | 47—25 |
| 2,590,221 | 3/1952 | Stevens. | |
| 2,949,698 | 8/1960 | Downey et al. | 47—32 |

FOREIGN PATENTS 30,195  10/1907  Austria.

ABRAHAM G. STONE, *Primary Examiner.*

P. A. RAZZANO, *Assistant Examiner.*